(12) United States Patent
Cottrill et al.

(10) Patent No.: US 11,995,220 B2
(45) Date of Patent: *May 28, 2024

(54) SECURE CPU ARCHITECTURE USING ENCRYPTION OF RETURN ADDRESSES

(71) Applicant: AT&T Intellectual Property I, L.P., Atlanta, GA (US)

(72) Inventors: William C. Cottrill, Canton, GA (US); Sheldon Kent Meredith, Roswell, GA (US); Peter Hardie, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 171 days.

This patent is subject to a terminal disclaimer.

(21) Appl. No.: 17/832,843

(22) Filed: Jun. 6, 2022

(65) Prior Publication Data

US 2022/0300661 A1    Sep. 22, 2022

Related U.S. Application Data

(63) Continuation of application No. 16/437,510, filed on Jun. 11, 2019, now Pat. No. 11,403,430.

(51) Int. Cl.
| | | |
|---|---|---|
| *G06F 21/72* | (2013.01) | |
| *G06F 21/50* | (2013.01) | |
| *G06F 21/52* | (2013.01) | |
| *G06F 21/54* | (2013.01) | |
| *G06F 21/70* | (2013.01) | |

(Continued)

(52) U.S. Cl.
CPC ............. *G06F 21/72* (2013.01); *G06F 21/50* (2013.01); *G06F 21/52* (2013.01); *G06F 21/54* (2013.01); *G06F 21/70* (2013.01); *H04L 9/002* (2013.01); *H04L 9/14* (2013.01); *H04L 9/16* (2013.01); *H04L 9/0869* (2013.01); *H04L 2209/80* (2013.01)

(58) Field of Classification Search
CPC .......... G06F 21/50; G06F 21/52; G06F 21/54; G06F 21/70–72; H04L 9/002; H04L 9/14–16; H04L 9/08; H04L 9/0861; H04L 9/0869; H04L 2209/80

See application file for complete search history.

(56) References Cited

U.S. PATENT DOCUMENTS

| | | |
|---|---|---|
| 5,881,279 A | 3/1999 | Lin et al. |
| 6,044,220 A | 3/2000 | Breternitz, Jr. |

(Continued)

*Primary Examiner* — D'Arcy Winston Straub
(74) *Attorney, Agent, or Firm* — Gantin & Gust, PLC; Ralph Trementozzi

(57) ABSTRACT

Aspects of the subject disclosure may include, for example, identifying, during a CPU's execution of a first program, a branching instruction of the first program that redirects execution to a second program. Responsive to the identifying of the branching instruction, a return address of a next instruction of the first program is encrypted. The encrypted return address is transferred to the second program without the CPU retaining a record of the return address. The encrypted return address is received from the second program responsive to its completion of execution. The received encrypted return address is decrypted to obtain the return address enabling a resumption of execution of the first program from the next instruction. Other embodiments are disclosed.

20 Claims, 10 Drawing Sheets

(51) Int. Cl.
  *H04L 9/00* (2022.01)
  *H04L 9/14* (2006.01)
  *H04L 9/16* (2006.01)
  *H04L 9/08* (2006.01)

(56) References Cited

U.S. PATENT DOCUMENTS

| | | |
|---|---|---|
| 9,606,855 B1 * | 3/2017 | Duvalsaint ............ G06F 9/3806 |
| 2002/0032891 A1 | 3/2002 | Yada et al. |
| 2003/0217277 A1 | 11/2003 | Narayanan |
| 2004/0208314 A1 | 10/2004 | Patariu et al. |
| 2008/0134297 A1 | 6/2008 | Clinick et al. |
| 2016/0094552 A1 * | 3/2016 | Durham ................. G06F 21/00 |
| | | 713/171 |
| 2016/0321178 A1 | 11/2016 | Wu et al. |
| 2017/0161071 A1 | 6/2017 | Pierson |
| 2018/0089427 A1 * | 3/2018 | Branco ..................... H04L 9/14 |
| 2018/0260564 A1 * | 9/2018 | Porteboeuf ............. G06F 21/54 |
| 2019/0087566 A1 * | 3/2019 | Hosie ...................... G06F 21/54 |
| 2020/0394335 A1 | 12/2020 | Cottrill et al. |

\* cited by examiner

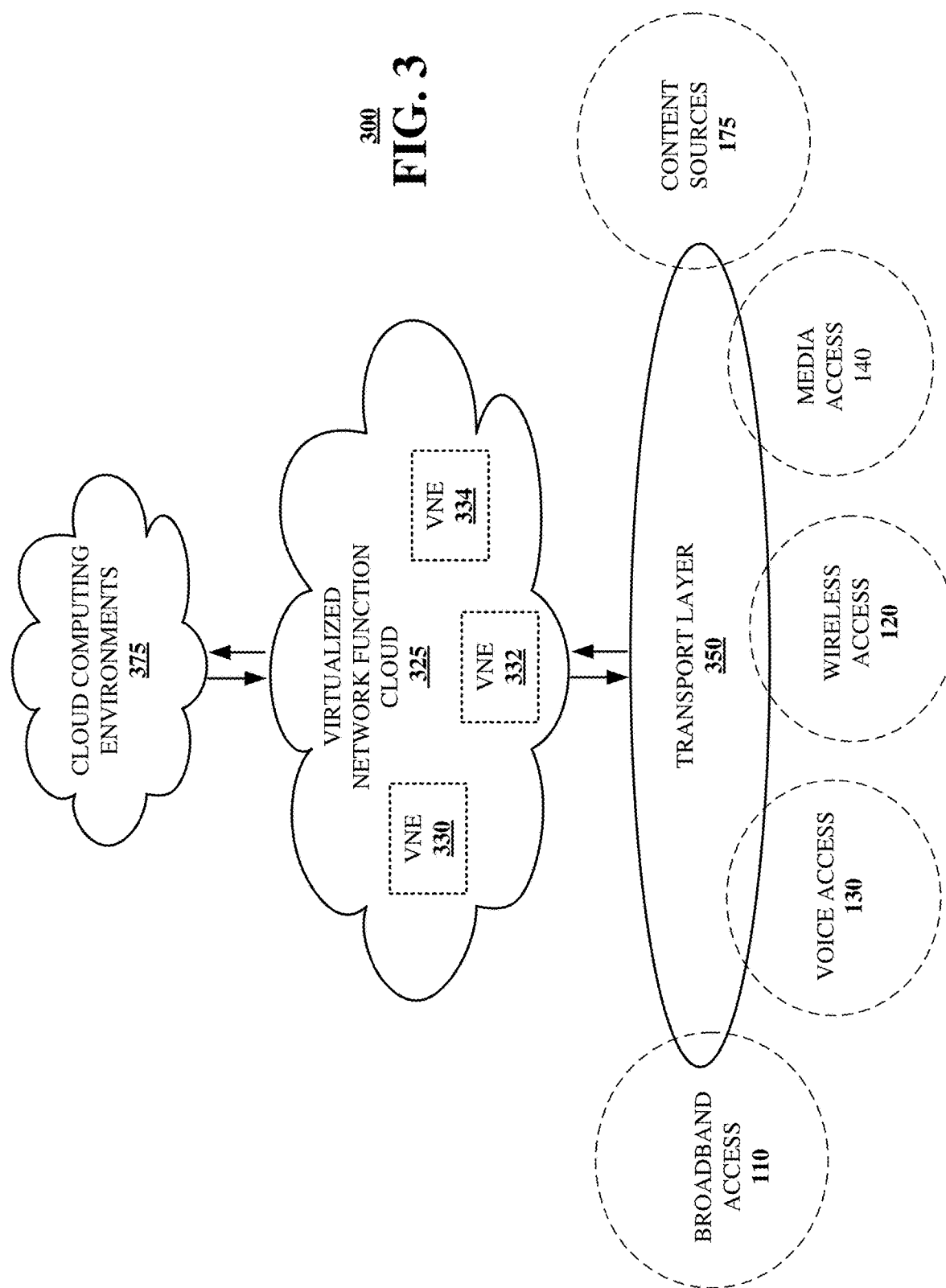

SECURE CPU ARCHITECTURE USING ENCRYPTION OF RETURN ADDRESSES

CROSS REFERENCE TO RELATED APPLICATIONS

This application is a continuation of U.S. patent application Ser. No. 16/437,510 filed on Jun. 11, 2019. All sections of the aforementioned application are incorporated herein by reference in their entirety.

FIELD OF THE DISCLOSURE

The subject disclosure relates to a secure CPU architecture using encryption of return addresses.

BACKGROUND

Central processing unit (CPU) architectures may vary, but they generally execute sets of predetermined instructions stored in memory locations accessible to the CPU. A group of instructions adapted to carry out a specific task, e.g., an application, is commonly referred to as a program. In at least some CPUs, the program instructions are executed sequentially according to an instruction cycle, sometimes referred to as a fetch-decode-execute cycle, or simply instruction cycle for short.

Execution of program instructions, to achieve an objective, is referred to as a process. Processes commonly rely on one or more sub processes, subroutines or functions to achieve their objective. A function implies a discrete action that produces a result. As functions may be shared by many processes, it is common for functions to be stored in respective memory locations that are different from a location of a program or process that calls the function, i.e., the calling process. For example, a CPU executing a first program may encounter an instruction within the first program that redirects or branches execution to another program, sometimes referred to as a "called" program or function. Accordingly, a CPUs instruction cycle that fetches instructions from a calling program memory location, is redirected by the function call to fetch instruction(s) from a different memory location associated with the called function.

Such function calls may result in a providing or passing of one or more values, i.e., data, in a return to the original, or "calling" program, after which processing of instructions of the calling program resumes. In such instances, the CPU requires the memory location of the calling program instructions, so that the CPU instruction cycle may resume execution of the calling program, essentially picking up where it left off at the time of the function call. In particular, the CPU requires an address of a next instruction step, i.e., the program instruction immediately following the function calling instruction. In so called "stateful" machines, a CPU may be adapted to maintain state information of one or more processes being handled by the CPU. State information can include data and/or memory locations of programs, functions, and the like. Understandably, keeping track of such state information requires greater complexity of a CPU architecture, which at any given moment may be handling dozens, or even hundreds or more processes.

Simpler CPU architectures, sometimes referred to as "stateless" machines, are adapted to handle one or more processes without necessarily retaining state information of the processes. In at least some examples, a CPU implements a memory structure, such as a runtime stack, that can be used to pass information between calling programs and called functions. With stateless machines, it is common for a CPU to pass a return address to a function at a time of the function call. The function can maintain the return address, which can be an address of a next instruction of the calling program, i.e., an instruction immediately following the function call. Accordingly, when execution of the function has completed, the function can pass the return address back to the CPU along with any other returned values. The CPU receiving the return address can commence execution of the original calling function.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
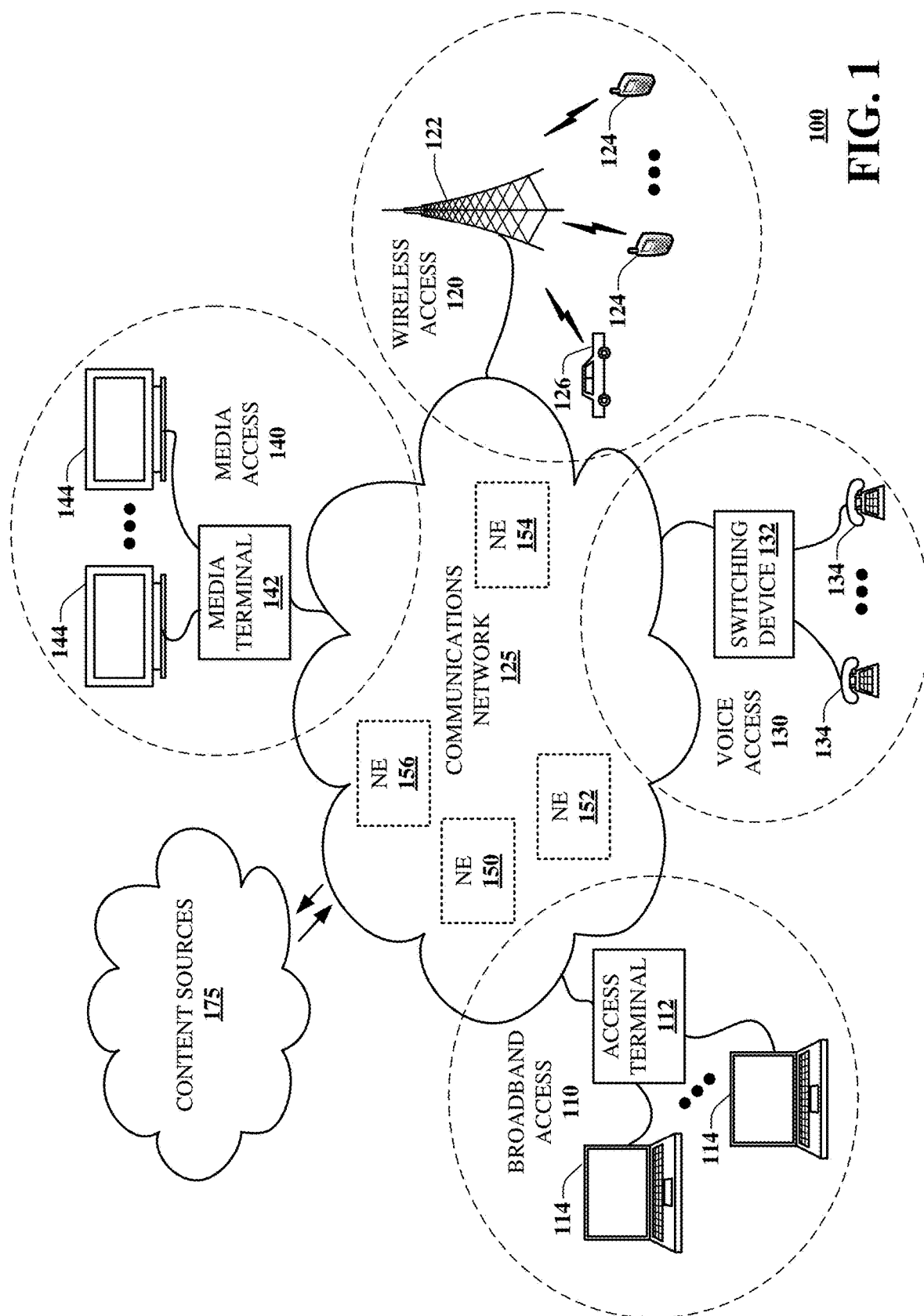
FIG. 1 is a block diagram illustrating an exemplary, non-limiting embodiment of a communications network in accordance with various aspects described herein.

The subject disclosure describes, among other things, illustrative embodiments for encrypting a return address during a CPU instruction cycle responsive to a function call encountered during execution of a program, and decrypting the return address subsequently provided by the called function during another CPU instruction cycle, which allows for a resumption of execution of the program, without requiring that the CPU retain state information of the program during execution of the function. The encryption and decryption can be accomplished with a private symmetric encryption key known only to the CPU. The encryption key can be static, or dynamic, e.g., varying according to one or more of a process identifier (ID), a time and/or date, and/or each function call. Other embodiments are described in the subject disclosure.

One or more aspects of the subject disclosure include a process, including receiving, by a processing system including a processor during execution of a first function by the processing system, a function-call instruction of a first group of instructions of the first function. Execution of the function-call instruction redirects execution by the processing system to a second group of instructions of a second function identified by the function-call instruction. Responsive to the receiving of the function-call instruction, the processing system encrypts a return address of a next instruction of the first group of instructions to obtain an encrypted return address. An instruction of the first group of instructions of the first function is stored at the return address. The processing system passes the encrypted return address to the second function, and receives from the second function, the encrypted return address responsive to completion of execution of the second function by the processing system. The processing system decrypts the encrypted return address received from the second function to obtain a decrypted return address, wherein execution of the first function by the processing system commences from the next instruction of the first group of instructions stored at the decrypted return address.

One or more aspects of the subject disclosure include device having a processing system including a processor and a memory that stores executable instructions that, when executed by the processing system, facilitate performance of operations. The operations include identifying, during execution of a program by the processing system, a function-call instruction of a first group of instructions of the program, wherein execution of the function-call instruction redirects execution by the processing system to a second group of instructions of a function identified by the function-call instruction. Responsive to the identifying of the function-call instruction, a return address of a next instruction of the first group of instructions is encrypted to obtain an encrypted return address. The encrypted return address is forwarded to the function. The encrypted return address is later received from the function responsive to completion of execution of the function by the processing system. The encrypted return address received from the function is decrypted to obtain a decrypted return address, wherein execution of the program by the processing system commences from an instruction location of the first group of instructions identified by the decrypted return address.

One or more aspects of the subject disclosure include machine-readable medium, including executable instructions that, when executed by a processing system including a processor, facilitate performance of operations. The operations include identifying, during execution of a first program by the processing system, a branching instruction of a first group of instructions of the first program, wherein execution of the branching instruction redirects execution by the processing system to a second group of instructions of a second program identified by the branching instruction. Responsive to the identifying of the branching instruction, a return address of a next instruction of the first group of instructions is encrypted to obtain an encrypted return address. The encrypted return address is transferred to the second program without retaining a record of the return address. The encrypted return address is received from the second program responsive to completion of execution of the second program by the processing system. The encrypted return address received from the second program is decrypted to obtain a decrypted return address, wherein execution of the first program by the processing system continues from an instruction location of the first group of instructions identified by the decrypted return address.

A significant and pervasive problem in computer security is a weakness in computer operating systems and CPU architectures which leave the computer systems vulnerable to a hacking exploit known as "stack smashing," "stack overflow," or "buffer overflow." If an infected process is running with system-level privileges or accepts data from untrusted network hosts (e.g., a webserver) then the buffer overflow architectural defect is a security vulnerability. Consider a case in which a process has two functions. A first function needs to invoke a second function via a CPU. The first function is running in memory and executing instructions with the CPU, which also keeps track of the memory location of each instruction being executed. When the first function requires a second function to run, the first function notifies the CPU regarding which function to run and it can also send data or pointers to data stored in memory to the CPU. The CPU copies the contents of an instruction pointer register (IPR) and uses it as a "return address." These parts of the "stack" are shared with the second function, typically as its input information. The second function runs and returns its results back to the CPU along with the return address. The CPU puts this return address back into the IPR and continues instruction execution for the first function. If the stack buffer is filled with data supplied from an untrusted first function, that function can corrupt the stack in a manner that causes an overflow of data into the stack location where the return address is stored. If this happens, when the second function completes, it sends a bogus return address and the CPU incorrectly starts executing commands from that memory address. If a stack overflow is implemented by a skilled hacker, the hacker can cause the return address to point to malicious code, allowing attackers to gain unauthorized access to a computer. A stack overflow can be exploited by providing more data for a data element in the stack than is allowed by the stack conventions (rules). This is the way (nearly all) modern computers work. Buffer overflows are regularly exploited by hackers to gain unauthorized access to systems and data. Each of the popular operating systems are fundamentally vulnerable to buffer overflow exploits, e.g., in any of numerous computer environments, including Windows® operating systems, Linux® operating systems, MacOSX® operating systems, Z-OS® operating systems, iOS® operating systems, Android® operating systems, and the like.

Disclosed herein are CPU architectural enhancements that implement functionality adapted to eliminate what are commonly called stack smashing, stack overflow, and buffer overflow exploits. The disclosed devices, processes and software make it essentially impossible for such exploits to be used. In at least some embodiments, the disclosed techniques do not require modification to current operating systems (OS) and/or application software, instead being implemented according to relatively minor modification to CPU architecture, e.g., being incorporated by any CPU manufacturer into "new silicon."

Referring now to FIG. 1, a block diagram is shown illustrating an example, non-limiting embodiment of a communications network 100 in accordance with various aspects described herein. For example, equipment of the communications network 100 can include processors, e.g., CPUs, that are adapted in whole or in part to encrypt return addresses during execution of programs responsive to function calls encountered during execution of the function calling programs. Likewise, return address subsequently provided by the called function are decrypted during execution, which allows for a resumption of execution of function calling programs, without requiring that any CPU retains state information of the function calling program during execution of called functions. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on). It is understood that any one or more of the aforementioned devices and/or systems of the example communications network 100 can be adapted to implement the disclosed encryption/decryption functionality to prevent insertion and/or execution of malicious code.

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
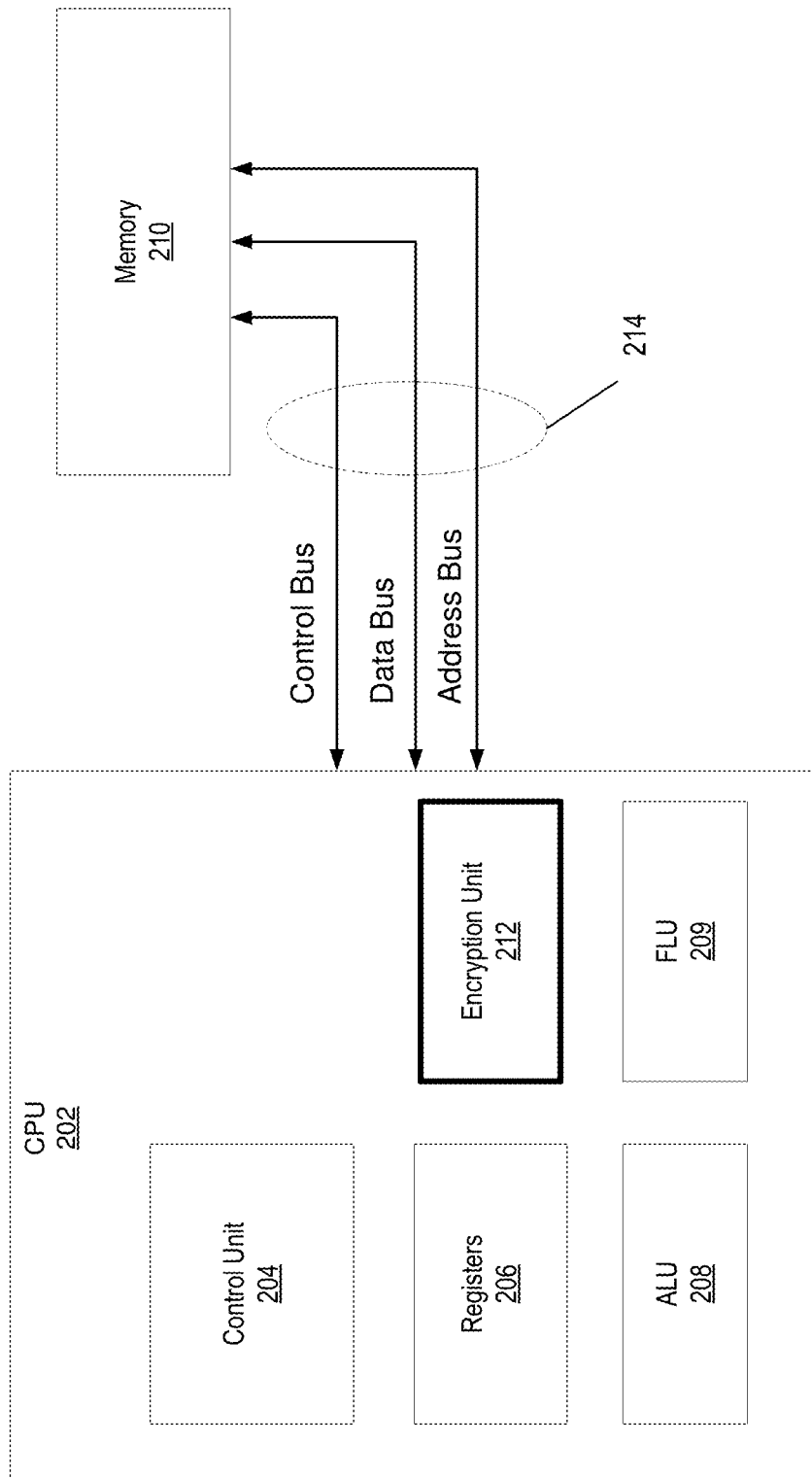
FIG. 2A is a block diagram illustrating an example, non-limiting embodiment of a processing system functioning within the communication network of FIG. 1 in accordance with various aspects described herein.

FIG. 2A is a block diagram illustrating an example, non-limiting embodiment of a processing system 200 functioning within the communication network of FIG. 1 in accordance with various aspects described herein. The processing system 200 includes a central processing unit (CPU) 202 in communication with a storage device, such as a memory 210 via a bus system 214. The CPU 202 can be implemented in a server, a mobile device, such as a mobile telephone (or other mobile terminal), a tablet, a personal digital assistant, a WINDOWS® X86-based system, an APPLE® computer using a Motorola or other type processor, a reduced instruction set computer (RISC), or any other type of computer or data processing system. The systems and methods disclosed herein may benefit systems using both fixed-size (RISC-based systems) and variable-sized (CISC based systems) instruction sets.

The storage device can include one or more of RAM and/or a ROM. Alternatively or in addition, the processing system can store in memory (e.g., a hard disk or other persistent storage). The memory 210 may contained within the CPU 202, e.g., a local cache. Alternatively or in addition, the memory 210 can be located external to the CPU 202, but in close proximity, e.g., on a common motherboard.

The CPU 202 includes a control unit 204 adapted to control various elements of the CPU 202 in the course of executing pre-programmed instructions. The CPU 202 also includes one or more registers 206 adapted to store values, such as data, pointers to data, memory addresses, and the like. An arithmetic logic unit (ALU) 208 and/or a floating point unit (FLU) 209 are also included to implement arithmetic, logic and/or floating point operations under the orchestration of the control unit 204. According to the illustrative embodiments disclosed herein, the CPU 202 also includes one or more encryption units 212. The encryption unit 212 can be adapted to encrypt, decrypt and/or encrypt and decrypt a value, such as data, a pointer to data, and/or an address. In at least some embodiments, the encryption unit 212 operates under orchestration of the control unit 204. Alternatively or in addition, the encryption unit 212 can be adapted, e.g., hardwired, to operate in response to certain instructions, such as branching instructions including function callas and/or function call returns.

According to at least some of the illustrative embodiments, the encryption unit 212 is adapted to encrypt a return address in response to a function call, and to pass the encrypted return address to the called function. This can be accomplished without requiring that the CPU 202 retain state information of the calling function, such as the return address. Rather, the called function returns the called address in cooperation with a return of execution from the called function to the calling function. The encryption unit 212 can be adapted to decrypt the return address before transferring the return address to an instruction pointer register of the CPU registers 206.

Figure 2B:
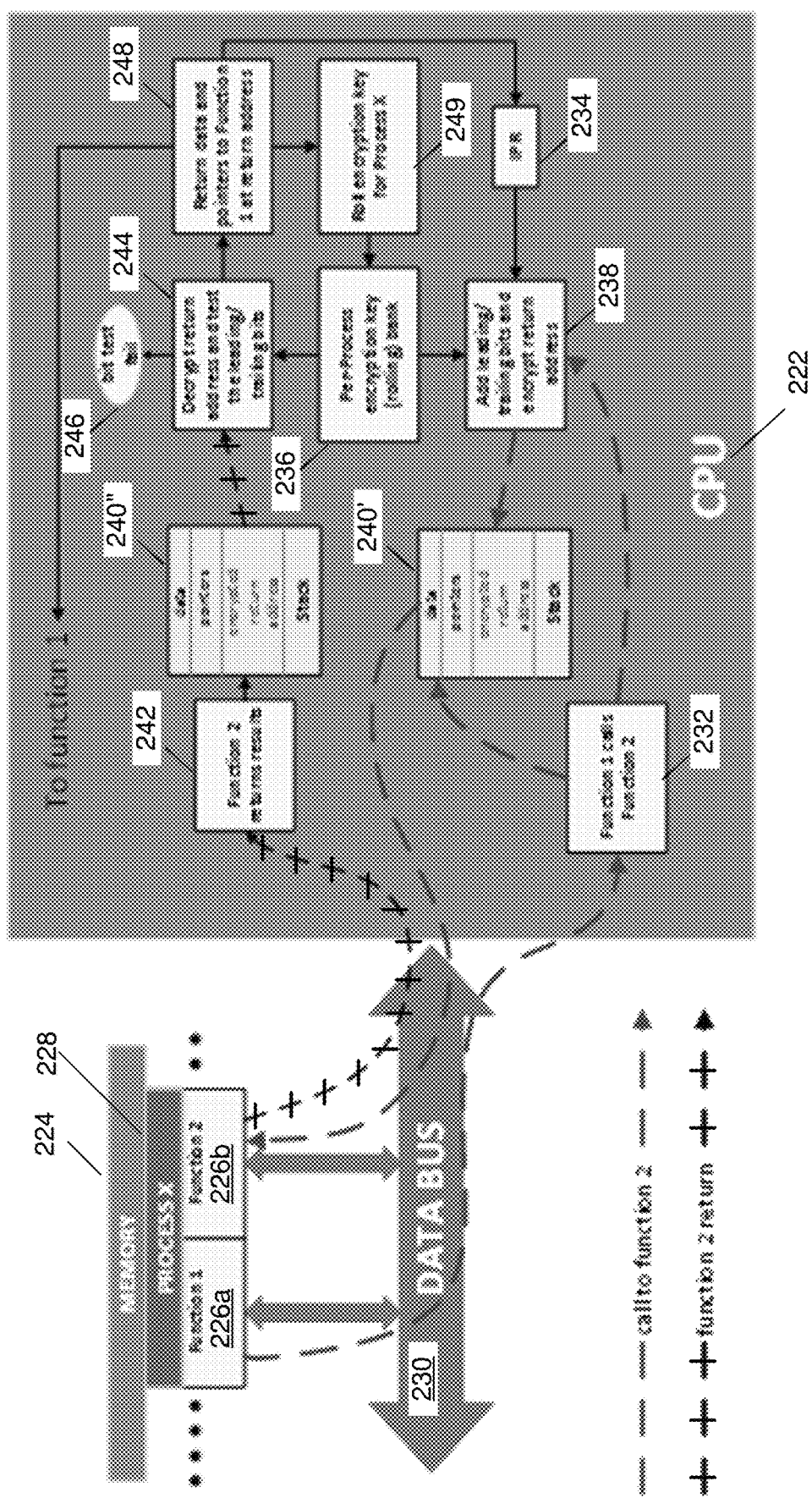
FIG. 2B is a block diagram illustrating an example, non-limiting embodiment of another processing system functioning within the communication network of FIG. 1 in accordance with various aspects described herein.

FIG. 2B is a block diagram illustrating an example, non-limiting embodiment of another processing system 220 functioning within the communication network of FIG. 1 in accordance with various aspects described herein. The processing system 220 includes a CPU 222 and a memory 224. The memory 224 stores information including groups of executable instructions associated with one or more programs, functions, libraries, subroutines, and the like. According to the illustrative example, the memory 224 stores a first group of instructions 226a associated with a first function, and a second group of instructions 226b associated with a second function. The functions can be linked, compiled with or otherwise associated with a common process. According to the illustrative example, the first function 226a and the second function 226b are both associated with a common process "X" 228.

Instructions of either function 226a, 226b are individually accessible from the memory 224 according to a storage address that identifies a storage location of the respective instruction within the memory 224. The processing system 220 includes one or more interconnects, e.g., busses, that allow for an exchange of information between the CPU 22 and the memory 224. The busses can include, without limitation, a data bus 230, and address bus and/or a control bus.

According to the illustrative example, the CPU 222 further includes an Instruction Pointer Register (IPR) 234. The IPR 234 generally holds an address value corresponding to a next instruction of a function currently being executed. Generally, the CPU 222 executes an instruction cycle, also known as the fetch-decode-execute cycle or simply the fetch-execute cycle. According to a fetch stage, the CPU 222 fetches from memory 224 a next instruction, e.g., the instruction associated with the address value in the IPR 234. At a conclusion of the fetch operation, the value in the IPR 234 is updated, e.g., to hold an address value corresponding to a next instruction of the function 226a being executed. In general, an instruction can include an instruction code, and one or more operands, or data values. Instruction codes can include any conceivable code, such as a memory read, a memory write, an arithmetic operation, a logical operation, and so on.

The CPU 222 includes decoder logic and/or circuitry adapted to decode or otherwise interpret the encoded portion of the instruction. For example, the decode stage can be adapted to interpret a code associated with a branching instruction, such as a function, subroutine or library call. Likewise, the decode stage can be adapted to interpret a code associated with a return from a branching instruction, such as a return from a function, subroutine or library call. It is understood that in at least some embodiments, such decoding is implemented in an architecture of the CPU 222, e.g., within hardware.

In an execute stage of the instruction cycle, a control unit 204 (FIG. 2A) the CPU 222 executes the decoded instruction. This can include without limitation, providing or otherwise passing decoded information, such as a sequence of control signals to the relevant functional units of the CPU 222 to performs the actions required by the instruction, such as reading values from registers 206 (FIG. 2A), providing them to the ALU 208 and/or FLU 209 (FIG. 2A) to perform mathematical and/or logic functions, and writing results back to a register 206.

According to the illustrative example, the CPU 222 further includes an encryption module 238 adapted to encrypt a value before storing and/or retrieving the value from a register 206 (FIG. 1) and/or a stack data structure, such as the illustrative runtime stack 240', 240". Likewise, the CPU 222 includes a decryption module 244 adapted to decrypt a value before storing and/or retrieving the value from the register 206 (FIG. 1) and/or a stack data structure, such as the illustrative runtime stack 240', 240". In at least some embodiments, the CPU 222 has an encryption key. For example, a private symmetric encryption key known only to the CPU 222 is generated by the encryption key generator 236 and/or stored in an encryption key register. The private symmetric encryption key value can be read from the encryption key register 236 and/or otherwise shared with one or more of the encryption module 238 or the decryption module 244.

It is understood that the encryption key may be a static key, and in at least some embodiments, hard-coded and/or hardwired into the hardware of the CPU 222. Alternatively or in addition, the encryption key value may be varied. For example, one or more encryption keys are updated according to a schedule, such as a time of day, a day of the week, month, year. Alternatively or in addition, encryption keys can be updated according to a number of uses, e.g., updated with each new request for a key, according to a function call, e.g., updated with each new branching or function call, and so on.

Updating of encryption keys can be according to any method of key generation generally known to those skilled in the art of encryption. For example, the keys can be generated and/or updated according to a key generation algorithm. Such key generation algorithms can accept a seed value that is used to generate a new key value based on the seed value. The seed value can be a random number, and/or related in some manner to one or more of a particular process being executed, a particular program or function being executed and/or called, a particular processor, process thread, and the like.

In at least some embodiments, a different encryption key is generated for each independent process being run by the CPU 222. Accordingly, the encryption key register 236 may hold a per-process encryption key. Any of the various kay generation and/or key management techniques disclosed herein and/or otherwise known to those skilled in the art, can include a so called rolling key. By way of non-limiting example, a rolling encryption key can be implemented as a predetermined group or bank of encryption keys. According to the illustrative embodiment, different banks of encryption keys can be established for each independent process and/or processor or CPU 222. The bank(s) of keys can be stored in an encryption key bank register 249. A selection of a particular encryption key of the bank of encryption keys can be changed or "rolled" according to an event, such as each function call.

The number and/or complexity of encryption keys can depend on one or more factors, such as a perceived threat, a value of the information be collected, limitations of processing resources, including complexity of CPU architecture, number of associated CPU cycles, register size, algorithm complexity, and so on. In at least some embodiments, it is understood that different key management schemes can be employed by the same CPU 222. For example one key management scheme implemented by the CPU 222 can implement a rolling key, using a key bank 249 that stores a predetermined number of predetermined encryption keys. Another key management scheme implemented by the same CPU 222 may use a single key, or a bank of keys having a different number of keys that are rolled according to a similar and/or different schedule and/or criteria. Some encryption keys may be per-process keys, while other keys may be static, applied simultaneously to multiple processes. The different key management schemes can be implemented sequentially, e.g., changing with a time of day, day of week, and so on. Alternatively or in addition, the different key management schemes can be implemented contemporaneously.

According to the illustrative example, the first function 226a executes instructions in the memory 224 and the current memory address is continuously updated by the CPU 222 in the IPR 234. When the first function 226a calls a second function 226b at 232, the first functions 226a sends data and/or pointers (to data) to the CPU 222, e.g., via the stack 240'. These data and/or pointers to data can become part of the stack 240', 240", generally 240. The CPU 222 also copies a memory pointer and/or address of the first function 226a from the IPR 234 to the stack 240. The CPU 222 then looks up an execution address of the second function 226b and puts that address in the IPR 234 and begins executing instructions for the second function 226b including sharing the stack 240 with the second function 226b. The IPR 234 is continuously updated while the second function 226b is executed by the CPU 222. When the second function 226b completes, it returns information back to the first function 226a via the CPU 222 at 242. Namely, the second function 226b sends data, pointers (to data), and/or the return address back to the first function 226a via the CPU 222. This can be accomplished using the stack 240". If the return address has been hacked or otherwise interfered with during execution of the second function 226b, then when the CPU 222 tries to use the return address to re-start execution of the first function 226a, it erroneously starts executing something else which may be malicious.

Beneficially, the example CPU 222 architecture that modifies the return address of the first function 226a by encrypting it using a key that 236a that can be static, unique to the process and/or dynamic. Before copying the first function's return address in the IPR 234 to the stack 240, the CPU 222 encrypts the memory pointer with the key using a reversible scheme. In at least some embodiments, a unique encryption key is generated by the CPU 222 each time the first function 226a makes a call to another function, such as the second function 226b. The call to the second function 226b utilizes the stack 240 to transfer information to the second function 226b, including the return address to the first function 226a.

It is understood that a static encryption key in a long-running function could eventually be hacked by a determined attacker. Implementing a rolling key that updates or rolls through a predetermined group or bank of predetermined encryption keys, e.g., according to each subsequent function call, makes it much more difficult for any malicious interference. A hacker typically desires to cause execution of a known code injection. If a bogus, encrypted return address is sent back to the CPU from a second function, when it gets decrypted, there essentially zero chance of it pointing to a hacker's injected code. However, there is a finite risk that it could point to some other undesired location where it would randomly execute something in memory and cause unpredictable problems.

In at least some embodiments, the CPU 222 is adapted to implement error checking. In at least some embodiments, the error checking includes appending a predetermined sequence of digits to the return address obtained from the IPR 234. These digits can be appended as leading and/or trailing bits to the address value. In some embodiments, the sequence of digits are appended by the encryption module 238. The predetermine sequence of digits can include a string of binary values, such as a string of 1's, a string of 0's or a string including a predetermined sequence of 1's and 0's. In at least some embodiments, the predetermined sequence of digits includes a checksum value. For example, the checksum can include a parity bit based on the return address value.

When the second function 226b returns its information back to the CPU 222, the decryption module 244 decrypts the encrypted return address, including any leading and/or trailing appended sequence of digits. After decryption, these so called "edge" bits can be removed from the address and checked or otherwise compared to a corresponding predetermined sequence value, before transferring the return address to the IPR 234. In at least some embodiments, a failure to match the extracted bits to the predetermined bits prevents a transfer of the return address of the first function to the IPR 234. For example, a failure to match results in a run-time error when function one times-out. Although a run-time error may not be desirable, it is generally preferable to the alternative of allowing the second function to return an address that points to malicious code and/or any random instruction execution. If no error is detected, the decryption module 244 passes the decrypted address, stripped of any error checking bits, to the IPR 234 at 248.

It is generally understood that encryption takes time to implement, with heavier or more complex encryption generally taking more time. On the other hand, lighter or less complex encryption generally takes less time. Accordingly, encryption schemes can be implemented to allow for a variation of a complexity of the encryption/decryption of the return addresses. In at least some embodiments, a complexity of the encryption can be dictated by one or more of the CPU 222, an OS, the calling function, i.e., the first function 226a, and the like. In some embodiments, the level of security is dependent upon the process, or other processes being executed by the CPU 222. Some processes can be perceived as being more or less vulnerable, allowing the encryption scheme to take advantage of less vulnerable scenarios by using a lighter or less complex encryption. Alternatively or in addition, the level of security can be dependent upon the calling function, the called function, or both. As with the processes, some functions can be perceived as being more or less vulnerable than others, allowing a lighter or less complex encryption to be implemented for less vulnerable functions.

It is further understood that the level of security can depend upon other scenarios, such as one or more of user associated with the processes, a service implemented by the processes, a location, e.g., geographic location, of the CPU 222, network services accessed by the processes and/or the CPU 222, and so on. In any of these scenarios, including combinations of more than one of the aforementioned scenarios, the vulnerability can be perceived as being more or less vulnerable, allowing the encryption to be implemented in a like manner, i.e., using lighter or less complex encryption for less vulnerable scenarios. It is understood that lighter or less complex encryption can include no encryption, or a simple scramble or hash, in at least some scenarios.

In at least one example, the security level is identified by the calling function, e.g., the first function 226a. The CPU 222 responds to this security level request by effecting a requested security level when encrypting the return address. In at least some embodiments, this can be accomplished by the key store or key generator 236 providing shorter or longer encryption keys. Alternatively or in addition, this can be accomplished by controlling the encryption module 238 and the decryption module 244 to implement a desired level of encryption. Accordingly, as stronger encryption takes more time, it can be applied selectively, occurring when demanded by the calling function.

Since it is possible for any process thread to be temporarily suspended before a called second function returns its data, it may be necessary for each calling function to have its own dynamic encryption key. If N processes are running on a CPU 222 core, there could be up to N encryption keys stored on the CPU 222. A key can be created by the key generator 236 at the invocation of any process. In at least some embodiments, the key is thereafter be dynamically updated each time there is a function call within that process. The process encryption key can be updated or "rolled" according to a trigger. For example, a triggering event is determined when the second function 226b within the process "X" 228 successfully returns a return address via the stack 240" that passes a bit check, after which the return address is deposited back into the IPR 234. The key generator 236 is adapted to update or roll the encryption key upon detection of a successfully returned address. With rolling keys per process, a hacker cannot keep trying different keys "until they randomly guess it." In at least some embodiments, varying depths of encryption can be employed to the disclosed embodiments, e.g., based on the function request and rolling encryption keys per call-out.

Figure 2C:
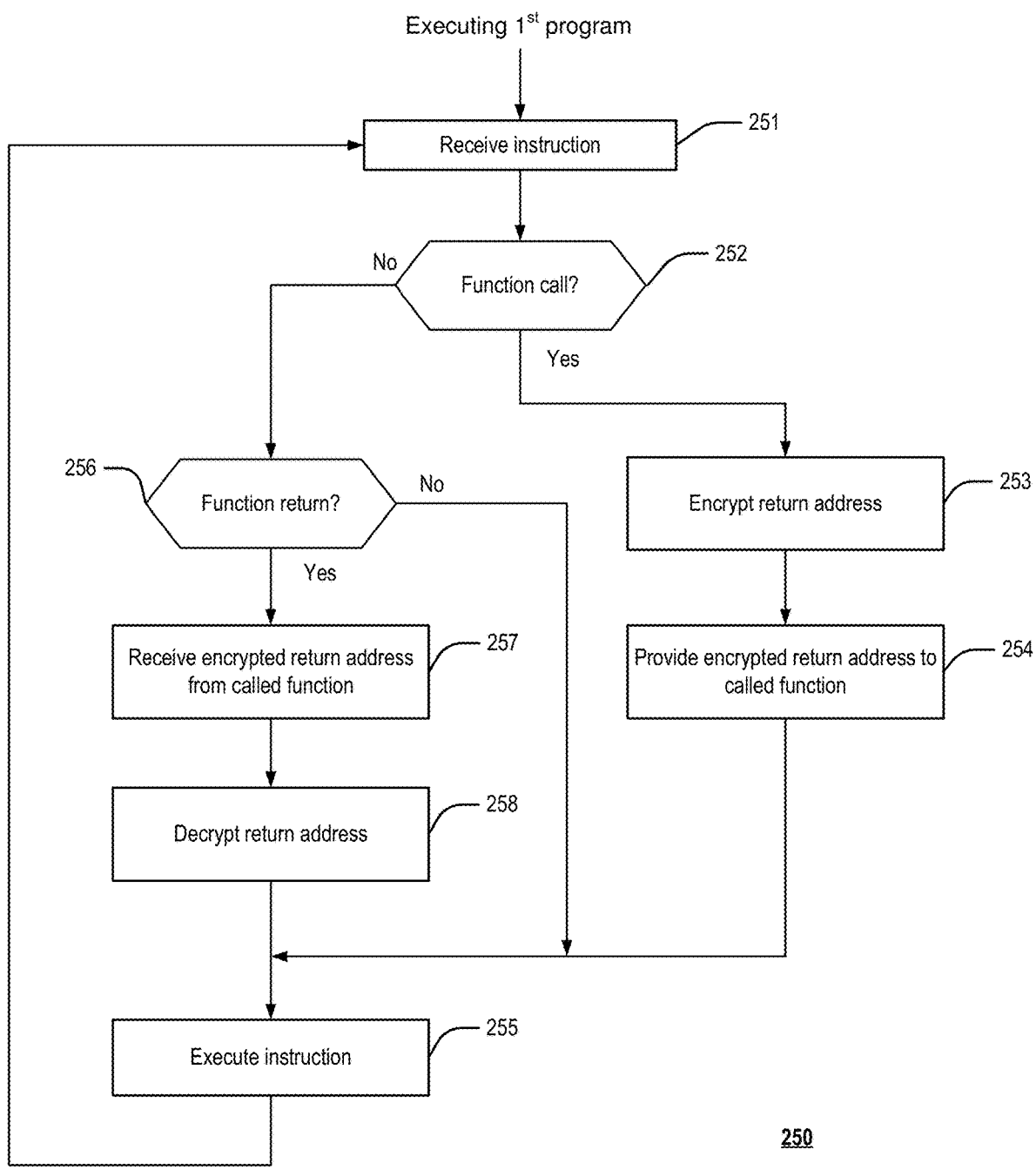
FIG. 2C depicts an illustrative embodiment of a process in accordance with various aspects described herein.

FIG. 2C depicts an illustrative embodiment of a process in accordance with various aspects described herein. The process 250 receives an instruction at 251. For example, the instruction is obtained from memory at an address pointed to by the IPR during a fetch cycle implemented by the CPU.

A determination is made at 252 as to whether the received instruction includes a function call. For example, the received instruction is decoded by the CPU during a decode stage of the instruction cycle. The decoded instruction can be compared to one or more codes of a branching instruction, such as a function, library, or subroutine call. The determination is made by the CPU during execution of the instruction.

To the extent it is determined at 252 the received instruction includes a function call, the process 250 encrypts the return address at 253. The encryption can be accomplished by an encryption module of the CPU according to any encryption technique generally known to those skilled in the art, including the various examples disclosed herein.

The encrypted return address is provided to the called function at 254. For example, the encrypted address is stored in a stack memory structure, such as a runtime stack. Stack values are passed to the called function, without requiring that the return address be retained by the CPU. This permits the techniques disclosed herein to be implemented on stateless processors.

To the extent it is determined at 252 the received instruction does not include a function call, the process 250 next determines whether the instruction includes a function return at 250. To the extent it is determined at 256 that the instruction does not include a function return, the process 250 executes the instruction at 255 and proceeds to receive a subsequent function at 251, and process the subsequent function in a like manner. Namely, instructions of the called function are executed at 255. The instructions of the called function are executed by the CPU according to the same instruction cycle, a next instruction address being loaded into an IPR upon execution of each function. The next instruction address associated with a next instruction stored in memory.

However, to the extent it is determined at 256 that the instruction does include a function return, an encrypted return address is received from the function at 257. A determination that the instruction includes a function return can be determined during a decode stage of the instruction cycle of the function return cycle. For example, the instruction code can be compared to one or more instruction codes associated with a function return, a library call return, a subroutine call return, and the like.

The received encrypted return address is decrypted at 258, and the instruction, i.e., the function return, is executed at 255. The process 250 proceeds to receive subsequent instructions at 251 and process the subsequent instructions in a like manner.

Figure 2D:
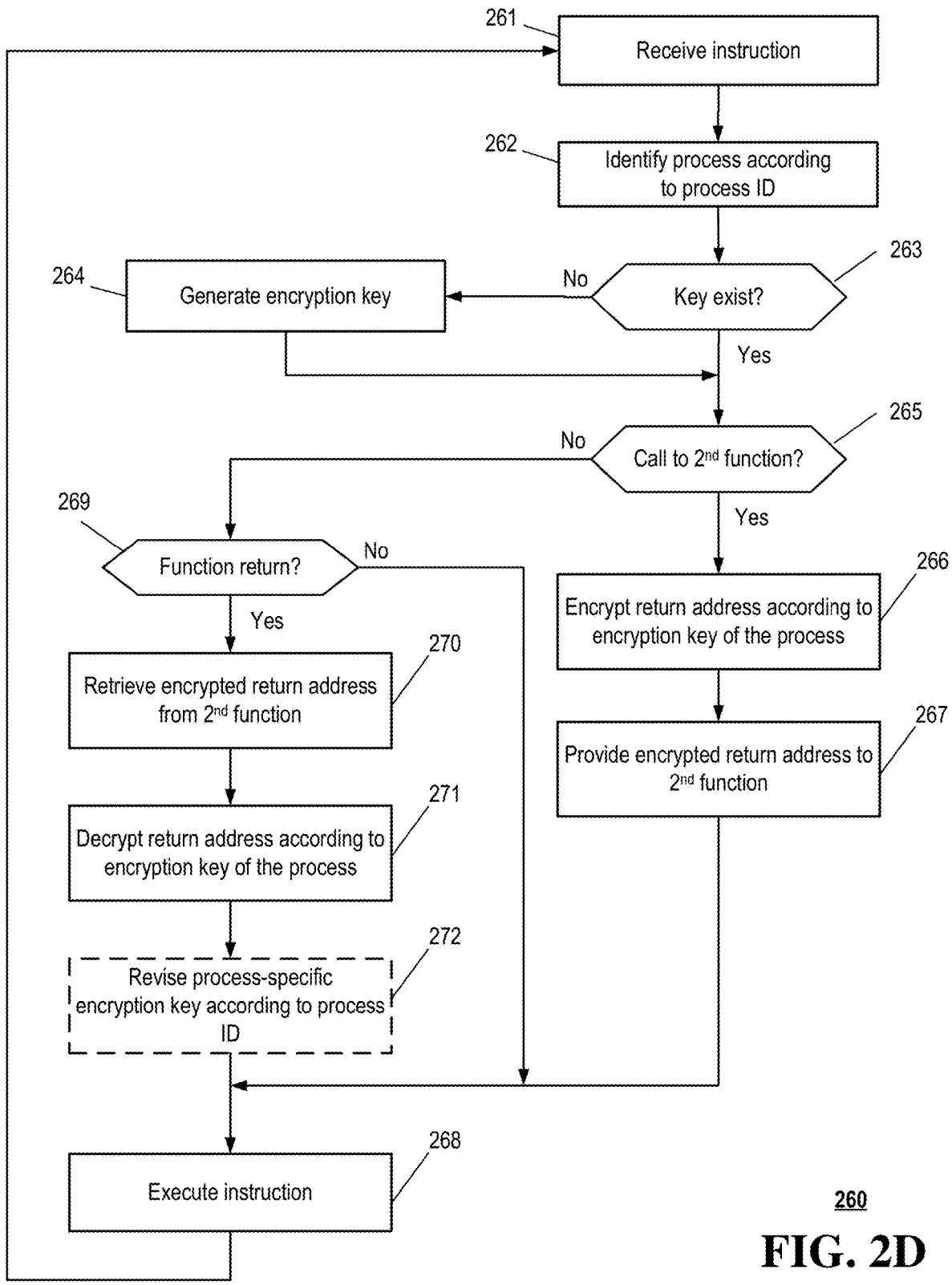
FIG. 2D depicts an illustrative embodiment of another process in accordance with various aspects described herein.

FIG. 2D depicts an illustrative embodiment of another process in accordance with various aspects described herein. The process 260 receives an instruction at 261. A process is identified at 262 according to a process ID. A determination is made at 263 as to whether an encryption key exists for the identified process ID. To the extent it is determined at 263 that a key does not exist, an encryption key is generated at 264. Having established an encryption key, the process 260 determines whether the received instruction includes a call to a second function at 265. In at least some embodiments, the process encryption key is determined at runtime, e.g., during execution of one or more programs.

For example, one or more encryption keys can be determined upon system startup, e.g., during or subsequent to a boot sequence. Alternatively or in addition, one or more encryption keys can be determined in a background process, e.g., when the CPU has spare cycles that can be dedicated to key generation. Such predetermined keys can be stored in a key cache on the CPU, in one or more registers of the CPU, or in some other secure storage device, e.g., memory, that is accessible to the CPU. Such predetermined keys can be assigned to processes upon a start of a process. Likewise, the keys can be decommissioned and destroyed and/or placed back into a pool of keys to be assigned to subsequent processes. Alternatively or in addition, a new key is generated upon initiation of a new process.

To the extent it is determined at 265 the received instruction includes a call to the second function, the process 260 encrypts the return address at 266. The encrypted return address is provided to the called second function at 267. Instructions of the called second function is executed at 268. To the extent it is determined at 265 the received instruction does not a call to the second function, the process 260 next determines whether the instruction includes a function return at 269. To the extent it is determined at 269 that the instruction does not include a function return, the process 260 executes the instruction at 268 and proceeds to receive a subsequent function at 261, and process the subsequent function in a like manner. However, to the extent it is determined at 269 that the instruction does include a function return, an encrypted return address is received from the function at 270.

The received encrypted return address is decrypted at 271, and the instruction, i.e., the function return, is executed at 268. The process 260 proceeds to receive subsequent instructions at 261 and process the subsequent instructions in a like manner.

In at least some embodiments, a process-specific encryption key is updated at 272 (shown in phantom). This can be updated, revised, regenerated and/or rolled according to any key update technique generally known to those skilled in the art, including the various illustrative embodiments, disclosed herein.

Figure 2E:
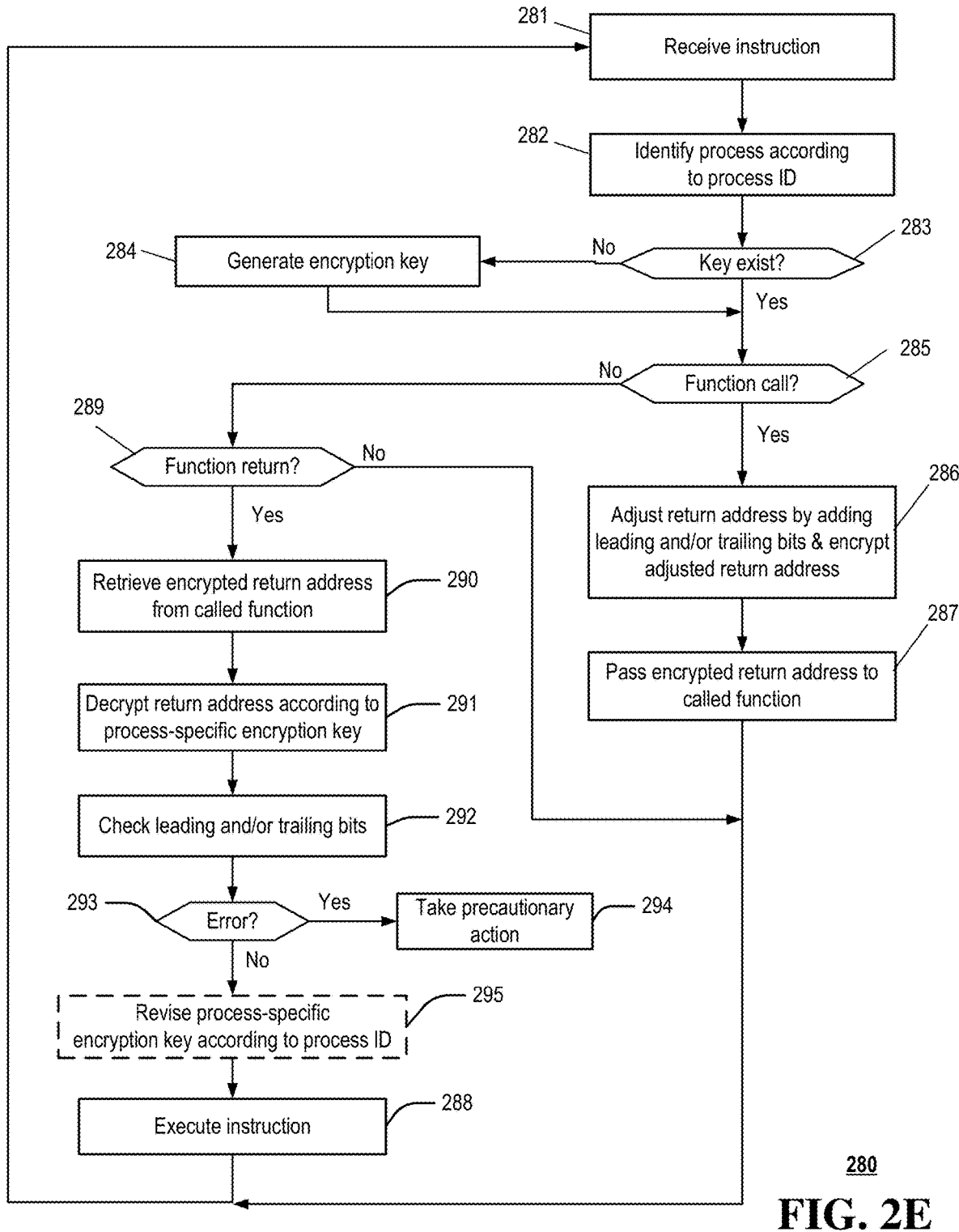
FIG. 2E depicts an illustrative embodiment of yet another process in accordance with various aspects described herein.

FIG. 2E depicts an illustrative embodiment of yet another process 280 in accordance with various aspects described herein. The process 280 receives an instruction at 281. A process is identified at 282 according to a process ID. A determination is made at 283 as to whether an encryption key exists for the identified process ID. To the extent it is determined at 283 that a key does not exist, an encryption key is generated at 284. Having established an encryption key, the process 280 determines whether the received instruction includes a call to a second function at 285.

To the extent it is determined at 285 the received instruction includes a call to the second function, the process 280 encrypts the return address at 286. The encrypted return address is provided to the called second function at 287. Instructions of the called second function is executed at 288.

To the extent it is determined at 285 the received instruction does not call the second function, the process 280 next determines whether the instruction includes a function return at 289. To the extent it is determined at 289 that the instruction does not include a function return, the process 280 executes the instruction at 290 and proceeds to receive a subsequent function at 281, and process the subsequent function in a like manner.

However, to the extent it is determined at 289 that the instruction does include a function return, an encrypted return address is received from the function at 290. The received encrypted return address is decrypted at 291 but before being passed to the IPR, the decrypted return address is checked for errors at 292. For example, the error checking can include comparing a parity bit, comparing a group of leading and/or trailing bits to a predetermined sequence of bits, and the like. The comparison can be accomplished by an error checking module 246 of the CPU 222 (FIG. 2B). An error condition is determined at 293 based on a comparison result. To the extent that an error is detected, e.g., the comparison failed, precautionary action can be taken at 294.

Precautionary action can include halting processing of the instruction, resulting in a run-time error. Alternatively or in addition, an error flag can be set in a flag register of the CPU. Other action can be taken to capture state information associated with the called function that provided the incorrect return address, e.g., to support a forensic investigation, should that be appropriate.

To the extent that an error is not detected at 293, e.g., the comparison passed, precautionary the CPU can resume at 288 allowing the CPU to process the calling program according to the CPU's instruction cycle fetching a next instruction from the decrypted return address. In at least some embodiments, a process-specific encryption key is updated at 295 (shown in phantom). The updating of the process-specific key can occur immediately following a determination that a valid return address was provided.

While for purposes of simplicity of explanation, the respective processes are shown and described as a series of blocks in FIGS. 2C-2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and processes 250, 260, 280 presented in FIGS. 1, 2A, 2C, 2D, 2E and 3. For example, virtualized communication network 300 can facilitate in whole or in part can include virtual processors, e.g., virtual CPUs that are adapted in whole or in part to encrypt return addresses during execution of programs responsive to function calls encountered during execution of the function calling programs. Likewise, return address subsequently provided by the called function are decrypted during execution, which allows for a resumption of execution of function calling programs, without requiring that any CPU retains state information of the function calling program during execution of called functions. In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations. It is understood that any one or more of the aforementioned devices and/or systems of the example virtualized communication network 300 can be adapted to implement the disclosed encryption/decryption functionality to prevent insertion and/or execution of malicious code.

Figure 4:
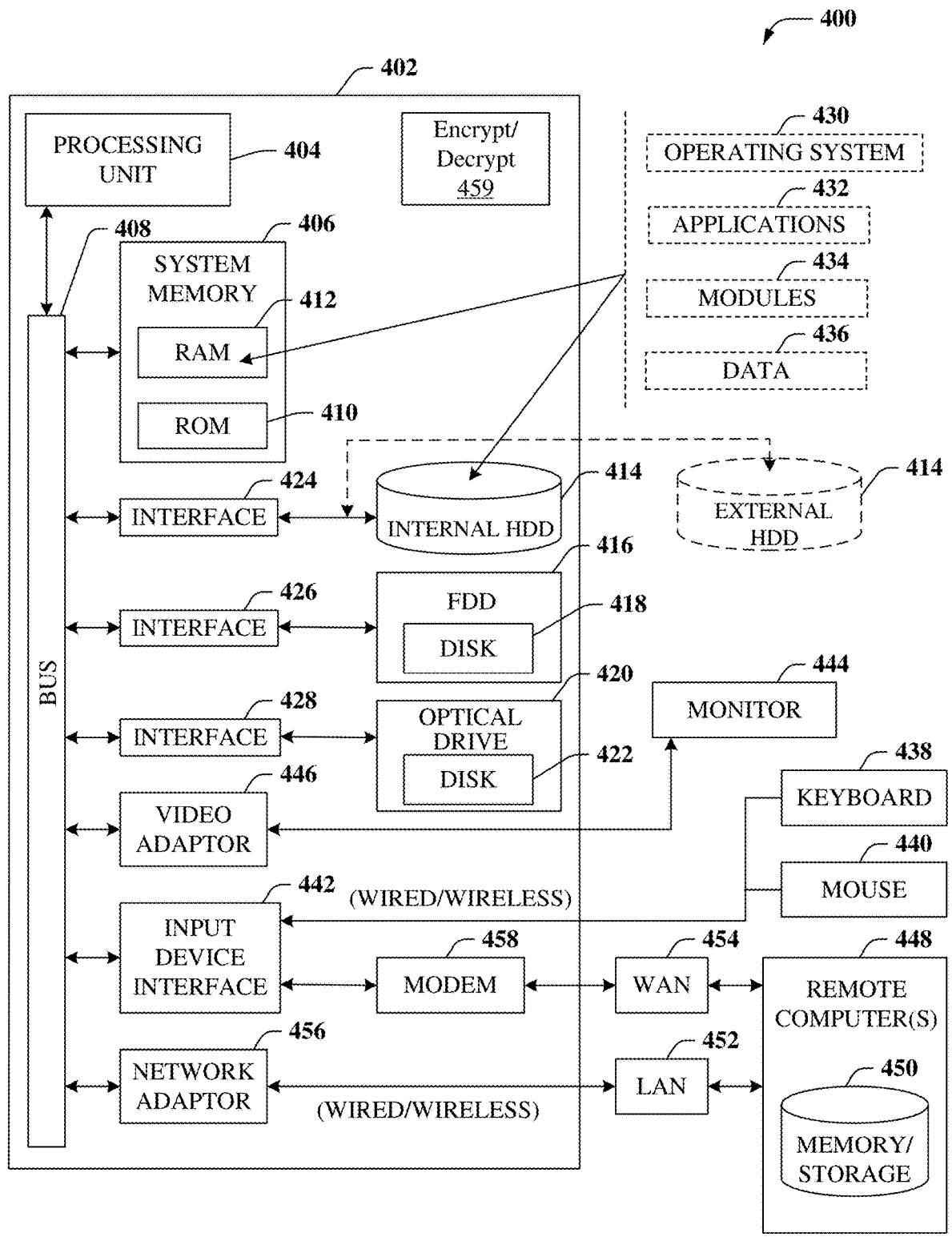
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can include processors, e.g., CPUs, that are adapted in whole or in part to encrypt return addresses during execution of programs responsive to function calls encountered during execution of the function calling programs. Likewise, return address subsequently provided by the called function are decrypted during execution, which allows for a resumption of execution of function calling programs, without requiring that any CPU retains state information of the function calling program during execution of called functions.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices. It is understood that any one or more of the aforementioned devices and/or systems of the example computing environment 400 can be adapted to implement the disclosed encryption/decryption functionality, e.g., including an encrypt/decrypt module 459, to prevent insertion and/or execution of malicious code.

Figure 5:
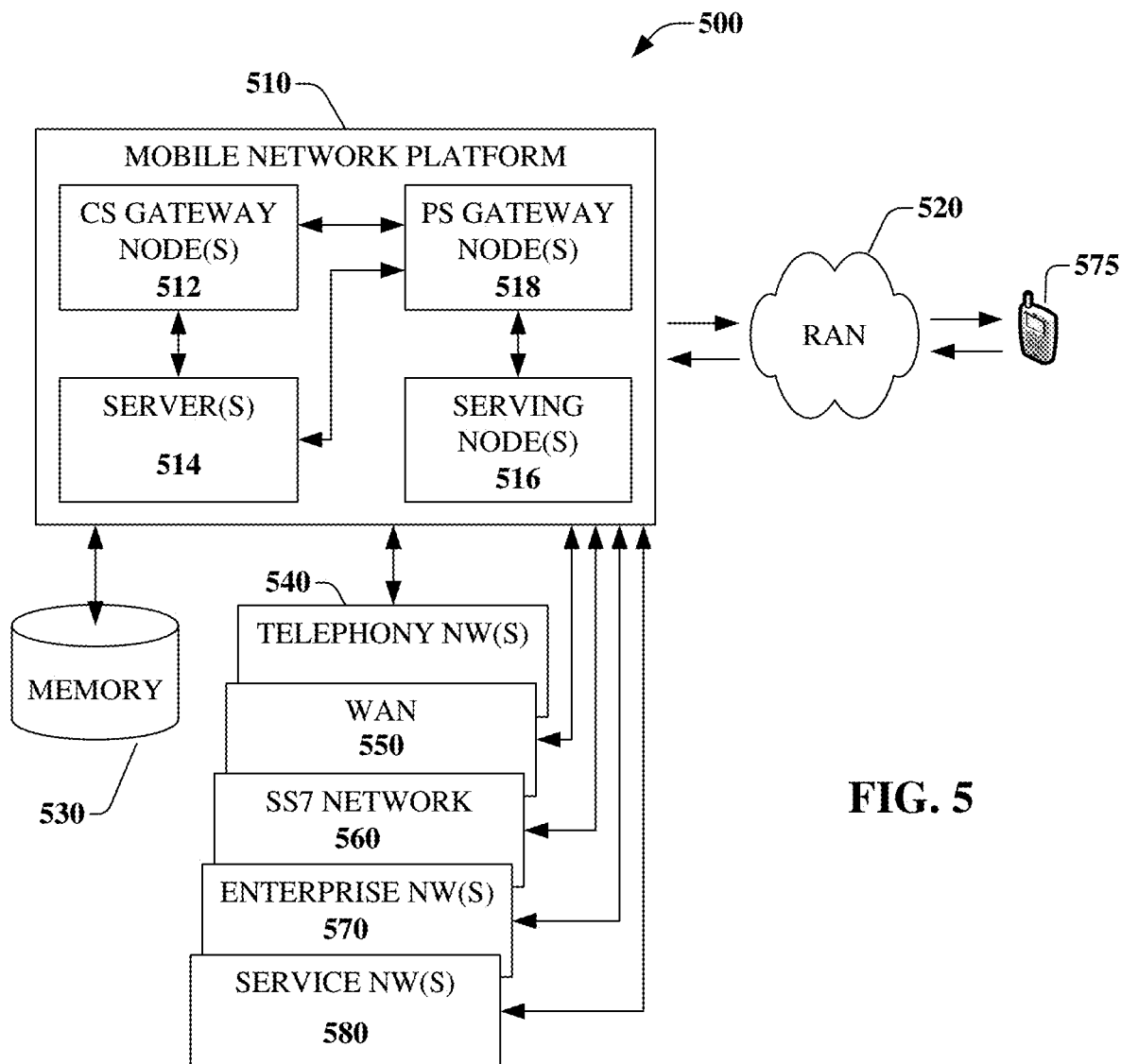
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part encrypting return addresses during execution of programs responsive to function calls encountered during execution of the function calling programs. Likewise, return address subsequently provided by the called function are decrypted during execution, which allows for a resumption of execution of function calling programs, without requiring retention of state information of the function calling program during execution of called functions. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types. It is understood that any one or more of the aforementioned devices and/or systems of the example embodiment 500 of the mobile network platform 510 can be adapted to implement the disclosed encryption/decryption functionality to prevent insertion and/or execution of malicious code.

Figure 6:
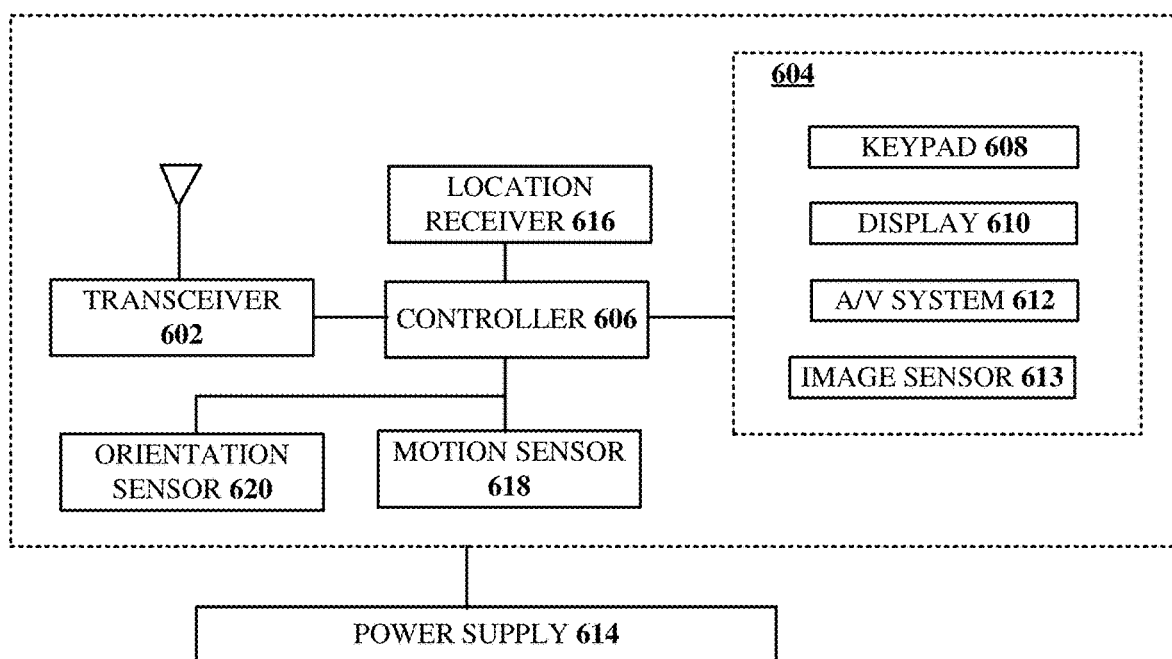
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can include processors, e.g., CPUs, that are adapted in whole or in part to encrypt return addresses during execution of programs responsive to function calls encountered during execution of the function calling programs. Likewise, return address subsequently provided by the called function are decrypted during execution, which allows for a resumption of execution of function calling programs, without requiring that any CPU retains state information of the function calling program during execution of called functions.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices. It is understood that any one or more of the aforementioned devices and/or systems of the example communication device 600 can be adapted to implement the disclosed encryption/decryption functionality to prevent insertion and/or execution of malicious code.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
   identifying, by a processing system including a processor, a security level according to a first function;
   generating, by the processing system and responsive to a first function call to a second function, a key value according to the security level, wherein the key value is unique to a process of a plurality of different processes executed by the processing system;
   encrypting, by the processing system, a return address of a next instruction of the first function according to the key value to obtain an encrypted return address, wherein an instruction of the first function is stored at the return address; and
   providing, by the processing system, the encrypted return address to the second function without retaining a record of the return address, wherein decryption of the encrypted return address received from the second function according to the key value yields a decrypted return address that allows the first function to commence processing from the next instruction stored at the decrypted return address.

2. The method of claim 1, wherein the providing of the encrypted return address to the second function further comprises pushing, by the processing system, the encrypted return address onto a runtime stack adapted to pass information comprising the encrypted return address between the first function and the second function.

3. The method of claim 2, further comprises popping, by the processing system, the encrypted return address from a runtime stack adapted to pass information comprising the encrypted return address between the first function and the second function.

4. The method of claim 1, wherein the encrypting of the return address further comprises using a private symmetric encryption key only accessible to the processing system, and wherein the security level is further dependent upon another scenario.

5. The method of claim 4, wherein the first function is associated with a first process of a plurality of processes executed by the processing system, the private symmetric encryption key being unique to the first process, and wherein the another scenario comprises a user associated with the processing system.

6. The method of claim 4, wherein the private symmetric encryption key is changed periodically, and wherein the another scenario comprises a location of a CPU of the processing system.

7. The method of claim 6, wherein the private symmetric encryption key is changed responsive to each occurrence of the first function call.

8. The method of claim 1, further comprising appending, by the processing system responsive to the first function call, an extra sequence of digits to the return address, resulting in an adjusted return address, wherein the encrypting of the return address comprises encrypting the adjusted return address.

9. The method of claim 8, wherein the extra sequence of digits further comprises a predetermined string of binary digits, wherein the encrypting and a decrypting are implemented in hardware, without requiring a modification to a current operating system.

10. The method of claim 9, wherein the decrypted return address further comprises the adjusted return address, the method further comprising:
extracting, by the processing system, the extra sequence of digits of the adjusted return address to obtain an extracted extra sequence of digits;
comparing, by the processing system, the extracted extra sequence of digits to the predetermined string of binary digits to obtain a comparison; and
terminating, by the processing system, execution of the first function responsive to the comparison indicating a disagreement between the extracted extra sequence of digits and the predetermined string of binary digits.

11. The method of claim 8, wherein the extra sequence of digits further comprises a predetermined string of binary digits comprises a checksum value of the return address.

12. The method of claim 1, wherein the providing of the encrypted return address to the second function occurs without the processing system retaining state information of the first function, and wherein the security level is identified by a calling function.

13. A device, comprising:
a processing system including a processor; and
a memory that stores executable instructions that, when executed by the processing system, facilitate performance of operations, the operations comprising:
identifying a security level according to a function;
generating, responsive to a first function call to a second function encountered during execution of a program, a key value according to the security level, wherein the key value is unique to a process of a plurality of different processes;
encrypting a return address of a next instruction of the first function according to the key value to obtain an encrypted return address, wherein an instruction of the first function is stored at the return address; and
forwarding the encrypted return address to the second function without retaining a record of the return address, wherein decryption of the encrypted return address received from the second function, according to the key value yields a decrypted return address that allows the first function to commence processing from an instruction location identified by the decrypted return address.

14. The device of claim 13, wherein the forwarding of the encrypted return address to the function further comprises pushing the encrypted return address onto a stack adapted to pass information comprising the encrypted return address to between the program and the function.

15. The device of claim 13, wherein the operations further comprise:
popping the encrypted return address from a stack adapted to pass information comprising the encrypted return address between the function and the program.

16. The device of claim 13, wherein the encrypting of the return address further comprises using a private symmetric key only available to the processing system.

17. A non-transitory, machine-readable medium, comprising executable instructions that, when executed by a processing system including a processor, facilitate performance of operations, the operations comprising:
identifying a security level according to a function;
generating, responsive to a branching instruction of a first plurality of instructions of a first program, a key value according to the security level, wherein the key value is unique to a process of a plurality of different processes executed by the processing system;
encrypting, a return address of a next instruction of the first plurality of instructions according to the key value to obtain an encrypted return address; and
transferring the encrypted return address to a second program without retaining a record of the return address, wherein decryption of the encrypted return address received from the second program, according to the key value, yields a decrypted return address that allows the first program to continues from an instruction location of the first plurality of instructions identified by the decrypted return address.

18. The non-transitory, machine-readable medium of claim 17, wherein the transferring of the encrypted return address to the second program further comprises pushing the encrypted return address onto a stack adapted to pass information comprising the encrypted return address between the first program and the second program.

19. The non-transitory, machine-readable medium of claim 17, wherein the operations further comprise:
popping the encrypted return address from a stack adapted to pass information comprising the encrypted return address between the first program and the second program.

20. The non-transitory, machine-readable medium of claim 17, wherein the encrypting of the return address further comprises applying a private symmetric key known only to the processing system.

* * * * *